US 8,395,348 B1

(12) United States Patent
Saatchi et al.

(10) Patent No.: US 8,395,348 B1
(45) Date of Patent: Mar. 12, 2013

(54) WIRELESS MOBILE COMMUNICATION DEVICE WITH MULTI-MODE CHARGING

(75) Inventors: Saeed Saatchi, Middletown, NJ (US); Frank LaRocca, Marlboro, NJ (US); Rita Sadhvani, Watchung, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 355 days.

(21) Appl. No.: 12/772,888

(22) Filed: May 3, 2010

(51) Int. Cl.
*H01M 10/44* (2006.01)
*H02J 7/00* (2006.01)

(52) U.S. Cl. ........ 320/101; 320/107; 320/108; 320/114; 320/115; 320/128

(58) Field of Classification Search .................. 320/101, 320/108
See application file for complete search history.

(56) References Cited

U.S. PATENT DOCUMENTS

| 2008/0185989 A1* | 8/2008 | Stenroos et al. | 320/101 |
|---|---|---|---|
| 2009/0058361 A1* | 3/2009 | John | 320/128 |
| 2009/0302799 A1* | 12/2009 | Marquet et al. | 320/101 |
| 2010/0141202 A1* | 6/2010 | Spies et al. | 320/101 |
| 2011/0084655 A1* | 4/2011 | Hui et al. | 320/108 |
| 2011/0125417 A1* | 5/2011 | Qing et al. | 702/34 |

FOREIGN PATENT DOCUMENTS

WO    WO 2007/071878    *    6/2007

* cited by examiner

*Primary Examiner* — Drew A Dunn
*Assistant Examiner* — Nathaniel Pelton

(57) ABSTRACT

A wireless mobile communication device may include a wireless communication system configured to communicate information wirelessly. A rechargeable power source may be configured to supply power to the wireless communication system. A plurality of energy conversion devices may each be configured to receive energy from a different type of energy source and convert that energy into electricity. A case may house the wireless communication system, the rechargeable power source, and the energy conversion devices.

15 Claims, 2 Drawing Sheets

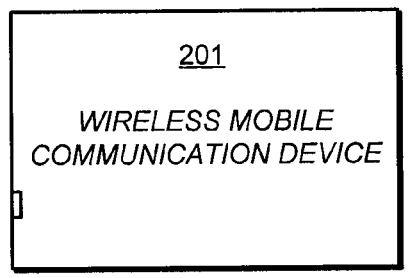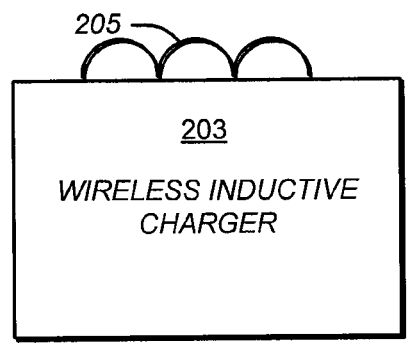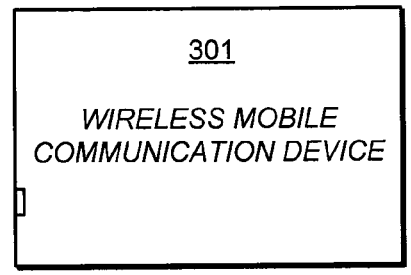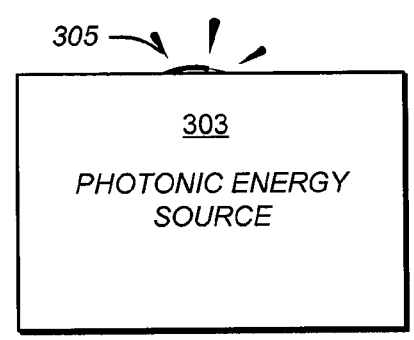
FIG. 2
FIG. 3
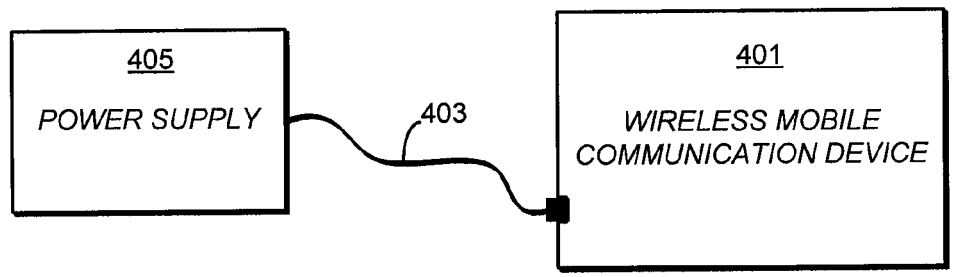
FIG. 4

WIRELESS MOBILE COMMUNICATION DEVICE WITH MULTI-MODE CHARGING

BACKGROUND

1. Technical Field

This disclosure relates to chargers for rechargeable energy sources, including rechargeable energy sources used in wireless mobile communication devices.

2. Description of Related Art

Rechargeable energy sources are used to supply energy to a variety of electronic devices, such as to wireless mobile communication systems.

Users take different approaches to recharging these rechargeable energy sources. Some users, for example, plug the output of a power supply into a connector in the wireless mobile communication system, such as a 120/240 volt power supply or a 12 volt cigarette lighter power supply. Other users recharge using a photonic energy source, such as sunlight or artificial light. Still other users recharge using a wireless inductive charger.

Each of these different charging approaches have required a different configuration of the wireless communication system. A user may therefore need to purchase custom accessories for each of these different recharging approaches. This can increase user costs and inconvenience.

SUMMARY

A wireless mobile communication device may include a wireless communication system configured to communicate information wirelessly. A rechargeable power source may be configured to supply power to the wireless communication system. A plurality of energy conversion devices may each be configured to receive energy from a different type of energy source and convert that energy into electricity. A case may house the wireless communication system, the rechargeable power source, and the energy conversion devices.

The case may include a base housing the wireless communication system and the rechargeable power source. The case may include a detachable cover which is detachably attach to the base and which houses the energy conversion devices.

The energy conversion devices may include an induction coil configured to receive electromagnetic radiation from a wireless inductive charger located outside of the case. The energy conversion devices may include a photovoltaic panel configured to receive photonic energy from a photonic energy source located outside of the case.

The detachable cover may include an induction source electrical contact configured to deliver energy received by the induction coil from the wireless inductive charger and a photovoltaic source electrical contact configured to deliver energy received by the photovoltaic panel from the photonic energy source. The base may correspondingly include an induction target electrical contact configured to automatically make electrical contact with the induction source electrical contact when the cover is attached to the base and to automatically break that contact when the cover is detached from the base. The base may correspondingly include a photovoltaic target electrical contact configured to automatically make electrical contact with the photovoltaic source electrical contact when the cover is attached to the base and to automatically break that contact when the cover is detached from the base.

One of the energy conversion devices may convert electromagnetic energy. One of the energy conversion devices may convert photonic energy. Either one can provide a charging source for the phone working jointly or independently.

The induction coil may be mounted beneath the photovoltaic panel.

The wireless mobile communication device may include a charging circuit and a fuel gauge circuit housed in the base. An input to the charging circuit may be connected to the target induction electrical contact. An input to the fuel gauge circuit may be connected to the target photoelectric electrical contact.

The wireless mobile communication device may include a magnetic flux shield housed in the cover and configured to shield the wireless communication system from magnetic flux generated by the induction coil. The magnetic flux shield may be mounted beneath the induction coil.

The detachable cover may house induction charger electronics configured to process electrical energy from the induction coil. The detachable cover may house photovoltaic charger electronics configured to process electrical energy from the photovoltaic panel.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

FIG. 2 illustrates a wireless mobile communication device with multi-mode charging being charged by a wireless inductive charger.

FIG. 3 illustrates a wireless mobile communication device with multi-mode charging being charged by a photonic energy source.

FIG. 4 illustrates a wireless mobile communication device with multi-mode charging being charged by a power supply connected to the wireless mobile communication device through an electrical cable.

DETAILED DESCRIPTION OF ILLUSTRATIVE EMBODIMENTS

Figure 1:
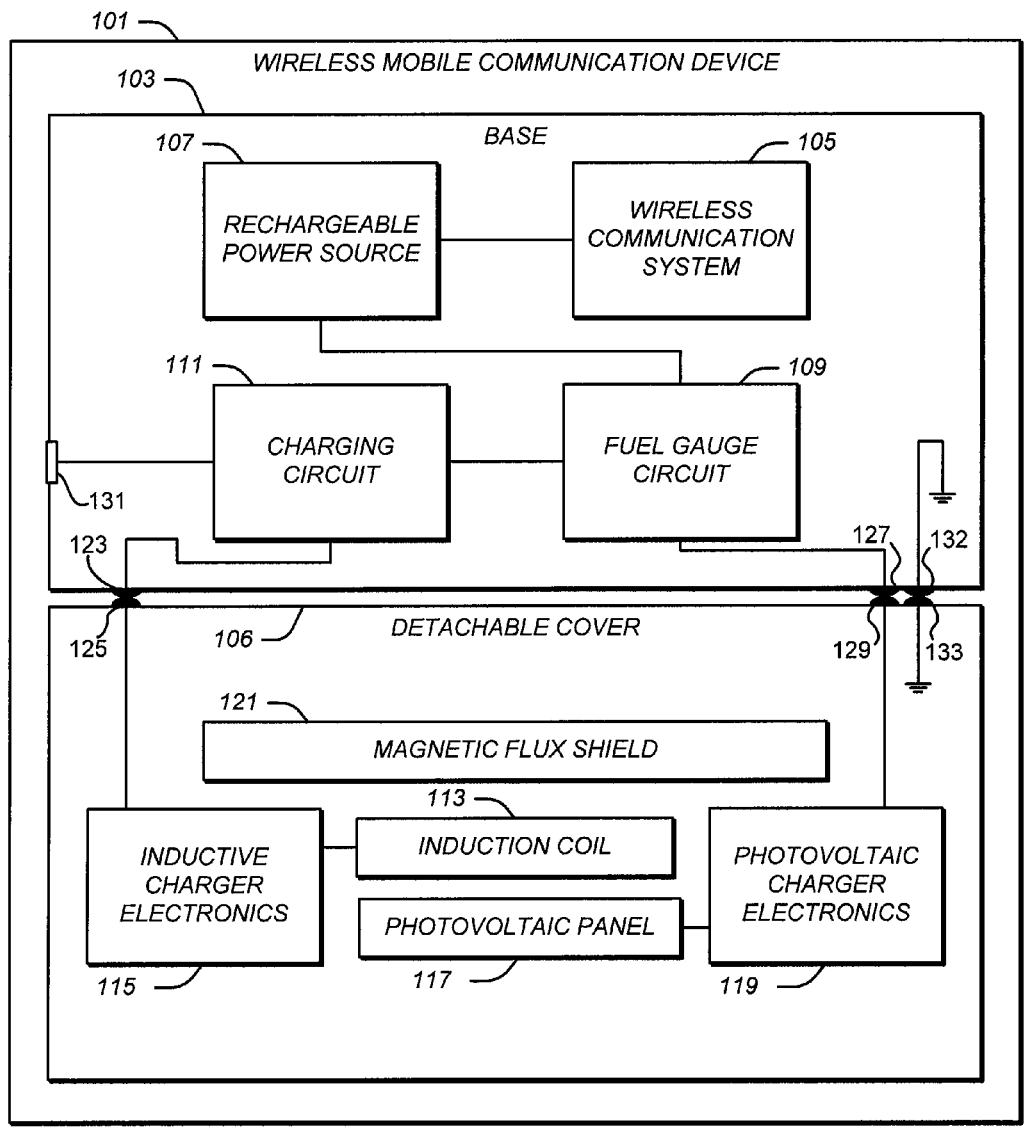
FIG. 1 illustrates a wireless mobile communication device with multi-mode charging.

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

FIG. 1 illustrates a wireless mobile communication device with multi-mode charging. As illustrated in FIG. 1, a wireless mobile communication device may be housed in a case 101. The case 101 may be made up of a base 103 and a detachable cover 106.

The base 103 may house a wireless communication system 105 configured to communicate information wirelessly, a rechargeable power source 107 configured to supply power to the wireless communication system 105, a fuel gauge circuit 109 configured to regulate the current flowing into the rechargeable power source 107 so as to minimize charging time while maximizing the longevity of the rechargeable power source 107, and a charging circuit 111 configured to rectify and filter charging current. The base 103 may include other components and/or may omit some of the components which have already been described.

The wireless communication system 105 may be of any type. For example, the wireless communication system 105 may include a cellular telephone communication system and/or a wireless data communication system. The wireless communication system 105 may be part of a cell phone, a PDA, a laptop, and/or a netbook. This cell phone, PDA, laptop, and/or netbook may be entirely housed in the case 101.

The detachable cover 106 may house the combination of an induction coil 113 and associated inductive charger electronics 115 and a magnetic flux shield 121. The detachable cover 106 may house a photovoltaic panel 117 and associated photovoltaic charger electronics 119. The detachable cover 106 may house other components and/or may omit some of components which have already been described. For example, the detachable cover 106 may house just the induction coil 113 and associated inductive charger electronics 115 and a magnetic flux shield 121 or the detachable cover 106 may house just a photovoltaic panel 117 and associated photovoltaic charger electronics 119.

The induction coil 113 may be configured to receive electromagnetic radiation from a wireless inductive charger located from outside of the case and to convert that electromagnetic radiation into an electrical current. The inductive charger electronics 115 may be configured to process electrical energy from the induction coil 113. The type of processing may vary. For example, the inductive charger electronics 115 may be configured to convert alternating current from the induction coil 113 into direct current. The inductive charger electronics 115 may in addition or instead be configured to alter the voltage level of the electrical current from the induction coil 113. The inductive charger electronics 115 may be configured to produce a substantially constant output voltage, notwithstanding variation in the output voltage of the induction coil 113. In some configurations, the output of the induction coil 113 may be connected directly to the charging circuit 111.

The photovoltaic panel 117 may be configured to receive photoelectric energy from a photonic energy source located outside of the case, such as from the sun and/or one or more electrical lights. The photovoltaic panel may be configured to convert the received photonic energy into an electrical current.

The photovoltaic panel 117 may include one or more photo cells and/or other devices configured to convert photonic energy into electricity.

The photovoltaic charger electronics 119 may be configured to process electrical energy from the photovoltaic panel 117. The photovoltaic charger electronics 119 may be configured to produce an output voltage which is substantially constant, notwithstanding variations in the output voltage of the photovoltaic panel 117. The photovoltaic charger electronics 119 may be configured to provide other signal processing functions.

The photovoltaic panel 117 may have a photonic energy receiving surface configured to receive photonic energy. This surface may be mounted on or may be part of the outside surface of the detachable cover 106, thus enabling the mobile communication device to readily receive photonic energy from an outside source when the detachable cover 105 is attached. The photovoltaic panel 117 may occupy all, virtually all, or only a small portion of an outer surface of the detachable cover 106.

The induction coil 113 may be mounted underneath the photovoltaic panel. The photovoltaic panel may be made of materials which are magnetically transparent. For example, the photovoltaic panel 117 may include a silicon-based substrate.

The magnetic flux shield 121 may be configured to shield the wireless communication system 105 and/or other components in the base 103 from any magnetic flux which might be generated by the induction coil 113 and/or which might penetrate the detachable cover 106 from an outside source. The magnetic flux shield 121 may be made of a material that blocks the transmission of magnetic flux, such as an iron-based material. The magnetic flux shield 121 may be positioned between the induction coil 113 and the base 103. It may occupy an area which is substantially equivalent to the entire surface area of the detachable cover 106 or a smaller area, such as an area which is just slightly larger than the area occupied by the induction coil 113. The photovoltaic panel 117 may be mounted on the detachable cover 106, followed by the induction coil 113 underneath the photovoltaic panel 117, followed by the magnetic flux shield.

The detachable cover 106 may be configured to reversibly attach to the base 103. This functionality may be facilitated by one or more fasteners, such as one or more screws and/or snap-type fittings.

One or more mating electrical contacts may be provided to facilitate breakable electrical connections between one or more electrical components in the base 103 and one or more electrical components in the detachable cover 106. These contacts may be of any type or in any configuration. One member of each set of contacts may be affixed to the base 103, while the corresponding member may be affixed to the detachable cover 106 at a location which ensures that the two will make electrical contact when the detachable cover 106 is attached to the base 103.

One set of mating contacts 123 and 125 may be used to electrically and detachably interconnect the inductive charger electronics 115 to the charging circuit 111. Another set of mating contacts 127 and 129 may be used to electrically and detachably connect the photovoltaic charger electronics 119 to the fuel gauge circuit 109. A third such set of mating contacts 132 and 133 may be used to electrically and detachably interconnect a ground on the detachable cover 106 to a ground on the base 103. A larger or smaller number of mating electrical contact sets may instead be used. The components in the base 103 that are electrically and detachably connected through a set of mating contacts to components in the detachable cover 106 may also be different.

The base 103 may also include a connector 131 configured to receive a mating connector through which electrical current may be provided to the charging circuit 111 to provide an additional source for charging the rechargeable power source 107. The output of the charging circuit 111 may be processed by the fuel gauge circuit 109. The electrical connector 131 may be of any type. For example, it may consist of or include a mini USB connector.

Various configurations of a detachable cover 106 may be manufactured and made available for use in connection with the base 103.

One configuration of the detachable cover, for example, may not contain any of the components illustrated in FIG. 1. Such a configuration may be useful to a user who is only interested in charging the rechargeable power source 107 through an electrical connection to the connector 131.

Another configuration of the detachable cover 106 may include only the induction coil 113, and the inductive charger electronics 115, and the magnetic flux shield 121. This configuration may be useful for a user who is interested in having the option of charging the rechargeable power source 107 either through an electrical connection to the connector 131 or from an inductance charger located outside of the case.

A still further configuration of the detachable cover 106 may include only the photovoltaic panel 117 and the photovoltaic charger electronics 119. This version may be useful for a user who is only interested in charging the rechargeable power source 107 through an electrical connector 131 or from a photonic energy source 127.

A still further configuration of the detachable cover 106 may include all of the components illustrated in FIG. 1. This version may be useful to a user who is interested in having the option of charging the rechargeable power source 107 through a direct electrical connection to the connector 131, from an inductance charger located outside of the case, and from a photonic energy source located outside of the case.

A still further configuration of the detachable cover may include a type of energy conversion device different from the induction coil 113 or the photovoltaic panel 117. For example, this configuration of the detachable cover 106 may include an energy conversion device which is configured to charge through magnetic resonance charging. Such a different energy conversion device may be included within the detachable cover 106 with or without the induction coil 113, the inductive charger electronics 115, the magnetic flux shield 121, the photovoltaic panel 117, and/or the photovoltaic charger electronics 119.

FIG. 2 illustrates a wireless mobile communication device with multi-mode charging being charged by a wireless inductive charger.

As illustrated in FIG. 2, a wireless mobile communication device 201 may be placed in close proximity to an inductive charger 203. The wireless mobile communication device may be any of the types of wireless mobile communication devices discussed above in connection with FIG. 1 that are configured to receive electromagnetic energy 205 from the inductive charger 203 and to convert it into electricity. For example, the wireless mobile communication device 201 may include a detachable cover which includes an induction coil, such as the detachable cover 106 and the induction coil 113 illustrated in FIG. 1. The mobile communication device may or may not include a connector for receiving a direct electrical connection of charging electricity, such as the connector 131, a photovoltaic panel for receiving photonic energy and for converting that photonic energy into electricity, and/or any other type of energy conversion device.

The inductive charger 203 may be any type of charger configured to generate electromagnetic energy for charging purposes. The inductive charger 203 may be configured to be connected to a source of energy, such as to an electrical outlet which supplies 110/240 volts and/or to a cigarette lighter outlet in a vehicle which supplies 12 volts.

FIG. 3 illustrates a wireless mobile communication device with multi-mode charging being charged by a photonic energy source. As illustrated in FIG. 3, a wireless mobile communication device 301 may be configured to receive photonic energy 305 from a photonic energy source 303. The wireless mobile communication device 301 may be any of the types of wireless mobile communication devices discussed above in connection with FIG. 1 that are configured to receive photonic energy 305 from the photonic energy source 303 and convert it into electricity. The mobile communication device may or may not include a connector for receiving a direct electrical connection of charging electricity, such as the connector 131 and/or a photovoltaic panel for receiving photonic energy and for converting that photonic energy. The wireless mobile communication device 301 may include a detachable cover which includes a photovoltaic panel on the outside of the cover, such as the photovoltaic panel 117 on the detachable cover 106 illustrated in FIG. 1. The detachable cover 106 may include one or more additional types of energy conversion devices, such as an induction coil. The wireless mobile communication device may also include an electrical connector configured to receive electrical charging energy through a wired source.

FIG. 4 illustrates a wireless mobile communication device with multi-mode charging being charged by a power supply connected to the wireless mobile communication device through an electrical cable. As illustrated in FIG. 4, a wireless mobile communication device 401 may be connected through an electrical cable 403 to a power supply 405. The wireless mobile communication device 401 may be any of the types of wireless mobile communication devices discussed above in connection with FIG. 1. The wireless mobile communication device 401 may be any other type of mobile communication device.

The wireless mobile communication device 401 may have a connector, such as the connector 131 illustrated in FIG. 1, configured to receive electrical energy through a wired connection, such as the electrical cable 403. The power supply 405 may be configured to deliver a supply of electrical energy through the electrical cable 403 to the wireless mobile communication device 401. The power supply 405 may be of any type. For example, it may be configured to be plugged into an electrical outlet which delivers 120/240 volts and/or a cigarette lighter in a vehicle which delivers 12 volts.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, the wireless mobile communication device shown in FIG. 2 may be built with only the induction coil 113 or the photovoltaic panel 117. The connector 131 may be provided in either instance.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. A wireless mobile communication device comprising:
a wireless communication system configured to communicate information wirelessly;
a rechargeable power source configured to supply power to the wireless communication system;
a plurality of energy conversion devices, each configured to receive energy from a different type of energy source and to convert that energy into electricity; and
a case housing the wireless communication system, the rechargeable power source, and the energy conversion devices,
wherein the case includes:
a base housing the wireless communication system and the rechargeable power source; and
a detachable cover housing the energy conversion devices, the detachable cover being detachably attached to the base;
wherein the energy conversion devices include:
an induction coil configured to receive electromagnetic radiation from a wireless inductive charger located outside of the case; and
a photovoltaic panel configured to receive photonic energy from a photonic energy source located outside of the case; and
wherein the detachable cover includes:
an induction source electrical contact configured to deliver energy received by the induction coil from the wireless inductive charger; and
a photovoltaic source electrical contact that is separate from the induction source electrical contact and that is configured to deliver energy received by the photovoltaic panel from the photonic energy source; and
wherein the base includes:
an induction target electrical contact configured to automatically make electrical contact with the induction source electrical contact when the cover is attached to the base and to automatically break that contact when the cover is detached from the base; and
a photovoltaic target electrical contact that is separate from the induction target electrical contact and that is configured to automatically make electrical contact with the photovoltaic source electrical contact when the cover is attached to the base and to automatically break that contact when the cover is detached from the base.

2. The wireless mobile communication device of claim 1 wherein the induction coil is mounted beneath the photovoltaic panel.

3. The wireless mobile communication device of claim 1 further comprising a charging circuit and a fuel gauge circuit house in the base and wherein:
an input to the charging circuit is connected to the target induction electrical contact; and
an input to the fuel gauge circuit is connected to the target photoelectric electrical contact.

4. The wireless mobile communication device of claim 1 further comprising a magnetic flux shield housed in the cover and configured to shield the wireless communication system from magnetic flux generated by the induction coil.

5. The wireless mobile communication device of claim 4 wherein the induction coil is mounted beneath the photovoltaic panel and the magnetic flux shield is mounted beneath the induction coil.

6. The wireless mobile communication device of claim 1 wherein the detachable cover houses:
induction charger electronics configured to process electrical energy from the induction coil; and
photovoltaic charger electronics configured to process electrical energy from the photovoltaic panel.

7. The wireless mobile communication device of claim 1 wherein:
one of the energy conversion devices converts electromagnetic energy; and
one of the energy conversion devices converts photonic energy.

8. A detachable cover configured to be detachably attached to a base housing a wireless communication system and a rechargeable power source, the detachable cover comprising a plurality of energy conversion devices, each configured to receive energy from a different type of energy source and to convert that energy into electricity,
wherein the energy conversion devices include:
an induction coil configured to receive electromagnetic radiation from a wireless inductive charger located outside of the cover and base when attached to one another; and
a photovoltaic panel configured to receive photonic energy from a photonic energy source located outside of the cover and base when attached to one another; and
wherein the detachable cover includes:
an induction source electrical contact configured to deliver energy received by the induction coil from the wireless inductive charger and to automatically make electrical contact with an induction target electrical contact in the base and to automatically break that contact when the cover is detached from the base; and
a photovoltaic source electrical contact that is separate from the induction source electrical contact and that is configured to deliver energy received by the photovoltaic panel from the photonic energy source and to automatically make electrical contact with a photovoltaic target electrical contact in the base when the cover is attached to the base and to automatically break that contact when the cover is detached from the base.

9. The detachable cover of claim of claim 8 wherein the induction coil is mounted beneath the photovoltaic panel.

10. The detachable cover of claim 8 further comprising a magnetic flux shield configured to shield magnetic flux generated by the induction coil.

11. The detachable cover of claim 10 wherein the induction coil is mounted beneath the photovoltaic panel and the magnetic flux shield is mounted beneath the induction coil.

12. The detachable cover of claim 8 further comprising:
induction charger electronics configured to process electrical energy from the induction coil; and
photovoltaic charger electronics configured to process electrical energy from the photovoltaic charger.

13. The detachable cover of claim 8 wherein:
one of the energy conversion devices converts electromagnetic energy; and one of the energy conversion devices converts photonic energy.

14. A device comprising:

an electronic device;

a rechargeable power source configured to supply power to the electrical device;

a plurality of energy conversion devices, each configured to receive energy from a different type of energy source and to convert that energy into electricity; and a case housing the electrical component, the rechargeable power source, and the energy conversion devices, wherein the case includes:
- a base housing the electronic device and the rechargeable power source; and
- a detachable cover housing the energy conversion devices, the detachable cover being detachably attached to the base;

wherein the energy conversion devices include:
- an induction coil configured to receive electromagnetic radiation from a wireless inductive charger located outside of the case; and
- a photovoltaic panel configured to receive photonic energy from a photonic energy source located outside of the case; and wherein the detachable cover includes:
- an induction source electrical contact configured to deliver energy received by the induction coil from the wireless inductive charger; and
- a photovoltaic source electrical contact that is separate from the induction source electrical contact and that is configured to deliver energy received by the photovoltaic panel from the photonic energy source; and wherein the base includes:
- an induction target electrical contact configured to automatically make electrical contact with the induction source electrical contact when the cover is attached to the base and to automatically break that contact when the cover is detached from the base; and
- a photovoltaic target electrical contact that is separate from the induction target electrical contact and that is configured to automatically make electrical contact with the photovoltaic source electrical contact when the cover is attached to the base and to automatically break that contact when the cover is detached from the base.

15. A detachable cover configured to be detachably attached to a base housing an electronic device and a rechargeable power source, the detachable cover comprising a plurality of energy conversion devices, each configured to receive energy from a different type of energy source and to convert that energy into electricity, wherein the energy conversion devices include:
- an induction coil configured to receive electromagnetic radiation from a wireless inductive charger located outside of the cover and base when attached to one another; and
- a photovoltaic panel configured to receive photonic energy from a photonic energy source located outside of the cover and base when attached to one another; and wherein the detachable cover includes:
- an induction source electrical contact configured to deliver energy received by the induction coil from the wireless inductive charger and to automatically make electrical contact with an induction target electrical contact in the base and to automatically break that contact when the cover is detached from the base; and
- a photovoltaic source electrical contact that is separate from the induction source electrical contact and that is configured to deliver energy received by the photovoltaic panel from the photonic energy source and to automatically make electrical contact with a photovoltaic target electrical contact in the base when the cover is attached to the base and to automatically break that contact when the cover is detached from the base.

* * * * *